(12) United States Patent
Hansen et al.

(10) Patent No.: US 7,188,659 B2
(45) Date of Patent: Mar. 13, 2007

(54) INJECTION-MOLDED PLASTIC GUIDE RAIL

(75) Inventors: Melf Hansen, Gondelsheim (DE); Harry Weinbrenner, Ostfildern (DE); Herbert Walter, Ebersbach (DE); Olaf Bühl, Albershausen (DE); Matthias Maier, Esslingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 138 days.

(21) Appl. No.: 10/932,758

(22) Filed: Sep. 2, 2004

(65) Prior Publication Data

US 2005/0045287 A1 Mar. 3, 2005

(30) Foreign Application Priority Data

Aug. 28, 2003 (DE) .............................. 103 39 583

(51) Int. Cl.
*B60J 3/00* (2006.01)
(52) U.S. Cl. ............................... 160/370.22; 160/273.1
(58) Field of Classification Search .......... 160/370.22, 160/271, 272, 273.1, 274, DIG. 2, DIG. 3; 296/97.8, 97.7; 16/96 R, 95 R, 94 R
See application file for complete search history.

(56) References Cited

U.S. PATENT DOCUMENTS

| 4,357,978 | A | * | 11/1982 | Keller et al. ................... 160/41 |
| 4,836,263 | A | * | 6/1989 | Ament ......................... 160/68 |
| 5,201,810 | A | * | 4/1993 | Ojima et al. ................. 160/265 |
| 5,482,104 | A | * | 1/1996 | Lichy ....................... 160/273.1 |
| 6,598,929 | B2 | * | 7/2003 | Schlecht et al. ........... 296/97.4 |
| 6,968,887 | B2 | * | 11/2005 | Hansen et al. ......... 160/370.22 |

FOREIGN PATENT DOCUMENTS

| DE | 90 10 440.4 U1 | 10/1990 |
| DE | 44 06 267 C2 | 11/1997 |
| DE | 100 62 690 A1 | 7/2002 |

* cited by examiner

*Primary Examiner*—David Purol
(74) *Attorney, Agent, or Firm*—Leydig, Voit & Mayer, Ltd.

(57) ABSTRACT

A window shade arrangement for motor vehicles that includes plastic injection molded guide rails designed such that they may be formed with injection tools that do not require moveable cores for forming guide grooves therein. In one embodiment, the guide rail includes an outer part (41) formed with a guide groove and a support part (42) made from less deformable material than the outer part for preventing widening of and deforming of the guide groove during usage. In another embodiment, the first and second molded parts are interconnectable to define the guide groove.

43 Claims, 6 Drawing Sheets

INJECTION-MOLDED PLASTIC GUIDE RAIL

BACKGROUND OF THE INVENTION

DE 100 57 759 A1 describes a rear window shade for motor vehicles. This rear window shade comprises a winding shaft that is rotatably supported underneath a rear window shelf, wherein one edge of the strip-shaped shade is fixed the winding shaft. The strip-shaped shade is cut into an approximately trapezoidal shape with its other end distant to the winding shaft fixed to a draw-out rod Movement of the draw-out rod is laterally guided in two guide rails that are either bonded to the inner side of the rear window or hidden in the car body behind the lining of a C-column. Elastically bendable thrust elements for moving the draw-out rod are guided in the guide rails in a buckle-proof fashion.

The guide rails consist of an extruded aluminum profile with a continuous undercut groove. The groove is composed of a section with a circular cross section and a section with a rectangular cross section, wherein the section with a rectangular cross section is narrower than the diameter of the circle. The rectangular section forms a slot that opens the guide groove in the outward direction.

Sliding or guiding elements move in the guide rails the sliding or guiding elements have a head, the cross section of which is adapted to the circular section of the guide rail profile. This head has the shape of a ball or a short cylindrical section, with dimensions such that it cannot become jammed in the curved sections of the guide rails. A diameter of a neck of the sliding or guiding elements is chosen such that it fits through the slot of the guide groove without getting stuck.

The head of the guiding element usually is an injection-molded plastic part. Long-term usage has revealed that the combination of the plastic part and an aluminum rail is not rattle-free under all conditions. The friction between the plastic guide elements and the aluminum guide rail is not suited for optimal relative movement. In addition, certain difficulties can occur when integrating the guide rail into the inside lining.

OBJECTS AND SUMMARY OF THE INVENTION

It is an object of the present invention to provide an improved guide rail arrangement for motor vehicle window shades that eliminates the foregoing disadvantages of the prior art.

According to one embodiment of the invention, the guide rail arrangement is composed of two parts. One part forms an outer part that is manufactured from an elastically deformable material. The other part serves as a support and is made of a less deformable material in order to ensure that the outer part containing an undercut groove is always stabilized and the slot width of the guide groove does not changed over time.

The significant advantage of this arrangement can be seen, among other things, in that injection-molding tools with a drawable core are not required for manufacturing various designs of the outer part. Since the material of the outer part can be elastically deformed, the injection-molded part can simply be removed from the core that produces the undercut groove during the injection-molding process. This significantly reduces the costs of the manufacturing method. It is possible, in particular, to integrate the outer part into a section of the inside lining of the motor vehicle. The support part itself does not contain undercut grooves so that its manufacture does not require injection-molding tools with movable cores.

The outer part may have a narrow, oblong shape that essentially follows the progression of the guide groove. The connecting means between the support part and the outer part may consist of snap-in means. These snap-in means comprise, for example, a hook that is in the form of an undercut tab. Complimentary connecting means are provided on the support part. It also is possible to utilize an undercut web in this case. An undercut web represents a simple solution on the support part because it can be manufactured, for example, in the form of an extruded profile that is subsequently bent into the desired shape.

The material of the outer part preferably is selected from a group of thermoplastics. This makes it possible to achieve the desired resilience, wherein the support part counteracts a possible deformation over time. For this purpose, the support part, which may be manufactured from a light metal, contains a region that laterally supports, at least sectionally, the guide groove on flanks in the installed condition. In the simplest design, the support part contains a groove that is U-shaped and has parallel flanks.

In another embodiment, the guide rail arrangement consists of a first part and a second part, both of which are molded. In this case, the joint between the two interconnected parts extends in the longitudinal direction of the guide groove. Due to this design, neither part needs to have undercuts. The undercut guide groove for the window shade is formed after the two parts are joined together.

Since neither part contains undercuts, it also is possible to make one of the two parts integrally with a section of the inside lining, for example, of the C-column. In other words, this part of the guide rail arrangement is injection-molded integrally with the plate-shaped part of the lateral lining.

Connecting means are provided on both parts in order to position the two parts relative to one another. The connecting means also may extend over the entire length of both parts. For example, one of the connecting means may consist of a web that cooperates with another connecting means in the form of a groove. The web may contain pins that engage into additional openings in the groove in order to effect proper positioning in the longitudinal direction of the guide groove.

In order to achieve a favorable force gradient that does not exert a disadvantageous bursting effect upon the two parts when the guide element of the window shade moves through the guide groove, it is advantageous if the web extends at an acute angle relative to a plane that is defined by the slot and extends through the slot.

In addition to the two interconnected parts, a support part of a less deformable material may be provided, wherein this support part is attached to the two interconnected parts. The support part serves to prevent the molded plastic parts from distorting. Such a distortion may be caused by aging or age-related shrinkage. The support parts stabilize the groove and ensure that the slot of the guide groove maintains a constant width over its entire length.

The two parts may at least sectionally be integrally connected to one another. Such an integral connection can be produced by means of laser welding, ultrasonic welding, bonding or other connecting techniques.

Other objects and advantages of the invention will become apparent upon reading the following detailed description and upon reference to the drawings, in which:

Figure 1:
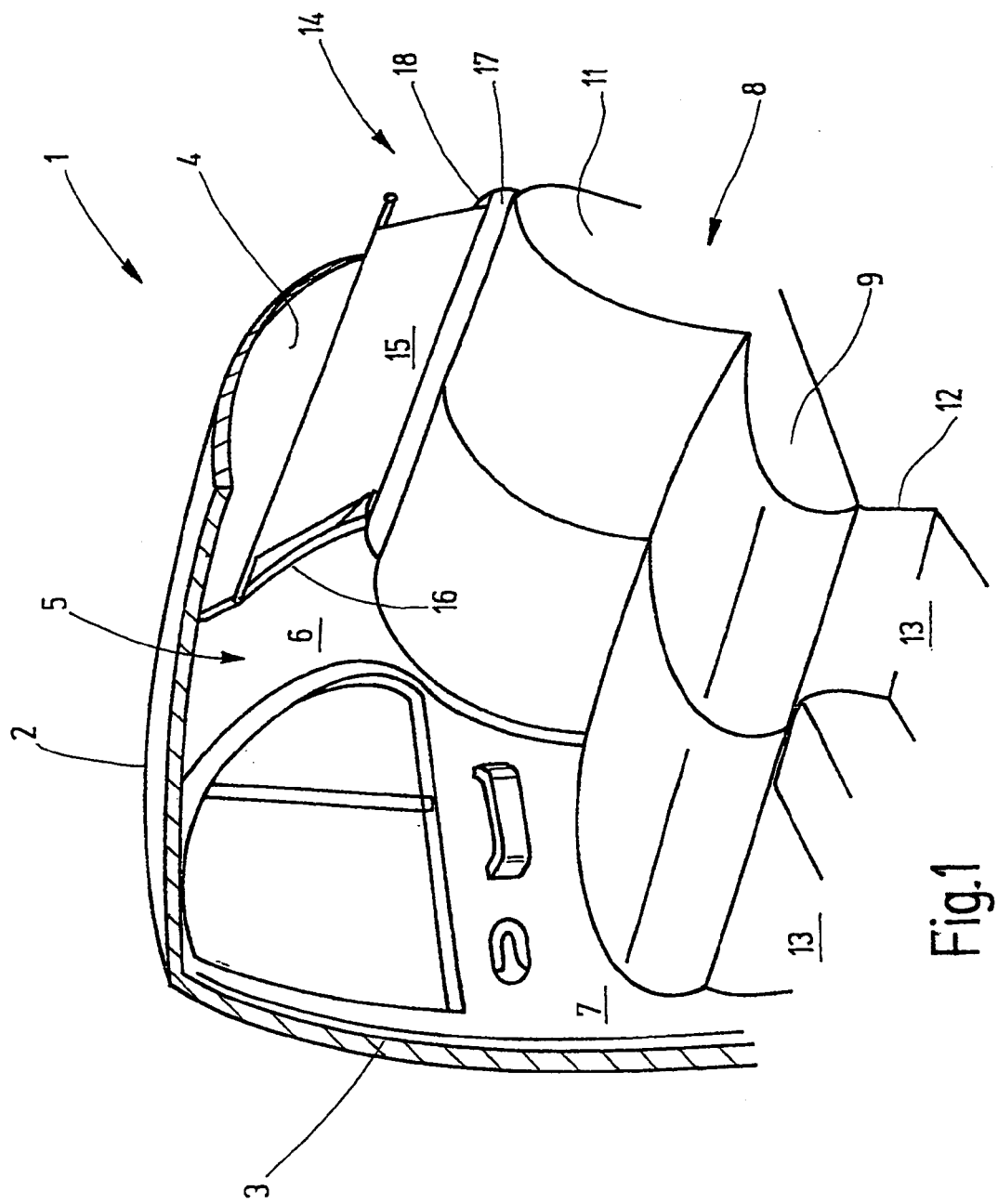
FIG. 1 is a partially open perspective of a motor vehicle showing an inner side of a rear window having a window shade according to the invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to FIG. 1 of the drawings, there is shown the inside of a passenger car having a rear window shade in accordance with the invention The passenger car includes a body section 1 that includes a roof 2, from which a B-column 3 laterally extends downward to a floor group, not shown. The roof 2 transforms into a rear window 4 on its rear edge. The rear window 4 laterally ends on a C-column 5 that is spaced apart from the B-column 3. The C-column 5 carries the inside lining 6.

As will be understood by persons skilled in the art, between the B-column 3 and the C-column 5, a right rear door 7 is conventionally hinged to the B-column 3. A rear bench 8 consisting of a seat 9 and a back rest 11 is arranged at the height of the right rear door 7. The rear seat 9 lies on a base surface 12 that forms part of the floor group, wherein a certain leg room 13 is created in this floor group in front of the rear seat 9.

A rear window shade 14 is mounted on the inner side of the rear window 4. The window shade 14 is a strip-shaped shade mounted for movement between lateral guide rails 16, being depicted in FIG. 1 in a partially extended position. The guide rails 16 begins at a rear window shelf 17 arranged behind the back rest 11 and extend adjacent to the lateral window edge. The strip-shaped shade 15 extends out of a continuous slot 18 arranged in the rear window shelf 17.

Figure 2:
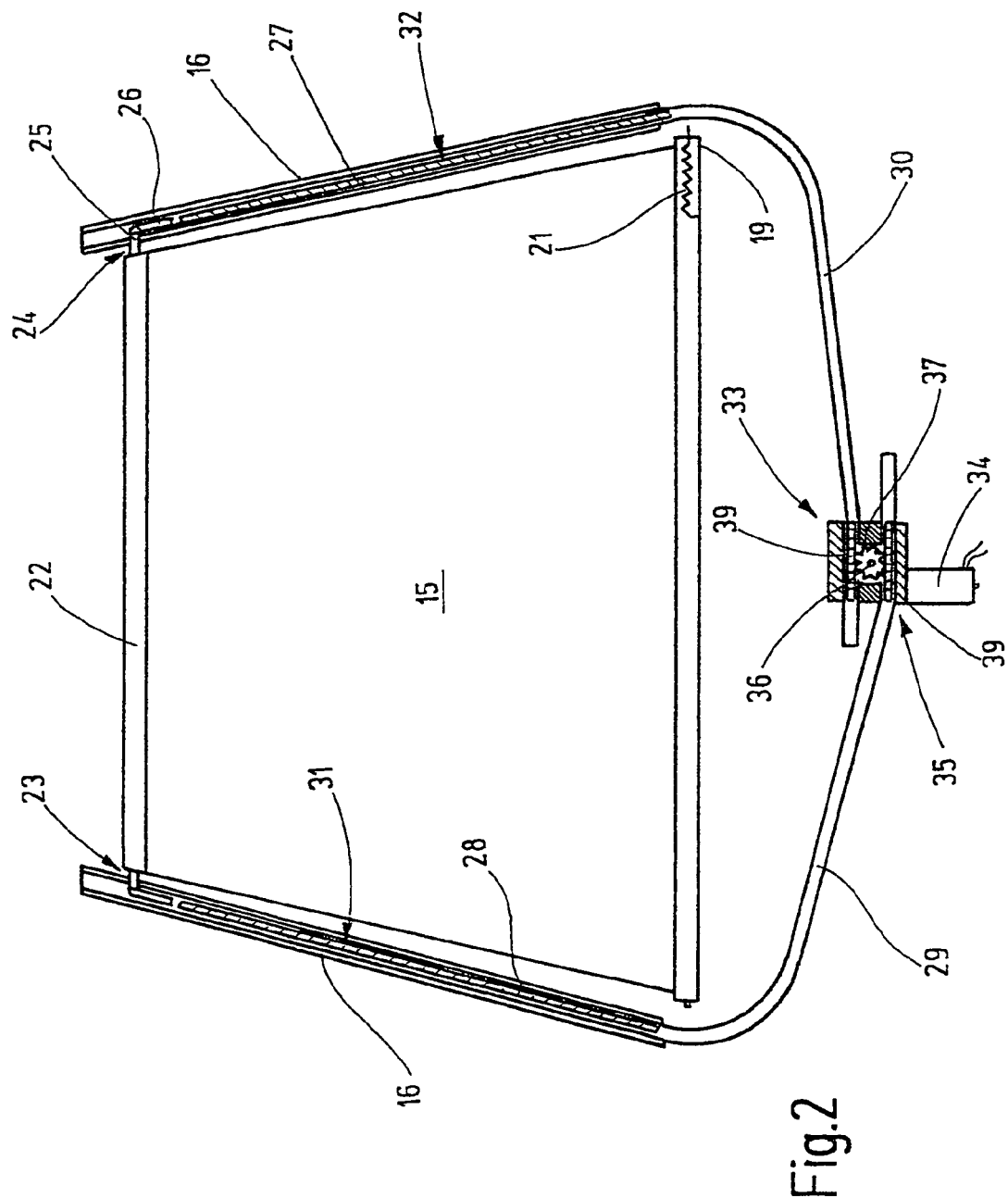
FIG. 2 is an enlarged depiction of the window shade of the motor vehicle shown in FIG. 1.

The window shade 14, the basic design of which is shown in FIG. 2, has a winding shaft 19 rotatably supported underneath the rear window shelf 17, with one edge of the strip-shaped shade 15 being fixed to this winding shaft. The winding shaft 19 is prestressed in the wind-up direction of the strip-shaped shade 15 on the winding shaft 19 with the aid of an appropriate spring drive 21. The spring drive 21 in this case is a coil spring, one end of which is rigidly anchored on the car body and the other end of which is fixed in the winding shaft 19.

The strip-shaped shade 15 has an approximately trapezoidal shape and is formed with a tubular loop 22 on an end opposite the winding shaft 19. A draw-out profile or hoop extends through the tubular loop 22 and telescopically supports guide pieces 23, 24 in its interior. The guide pieces 23, 24 contain a neck part 25 of smaller diameter than an adjacent guide element 26 that has the shape of a short cylindrical section. The guide pieces 26 move in the guide rails 16 arranged adjacent opposite lateral edges of the rear window 4.

Figure 3:
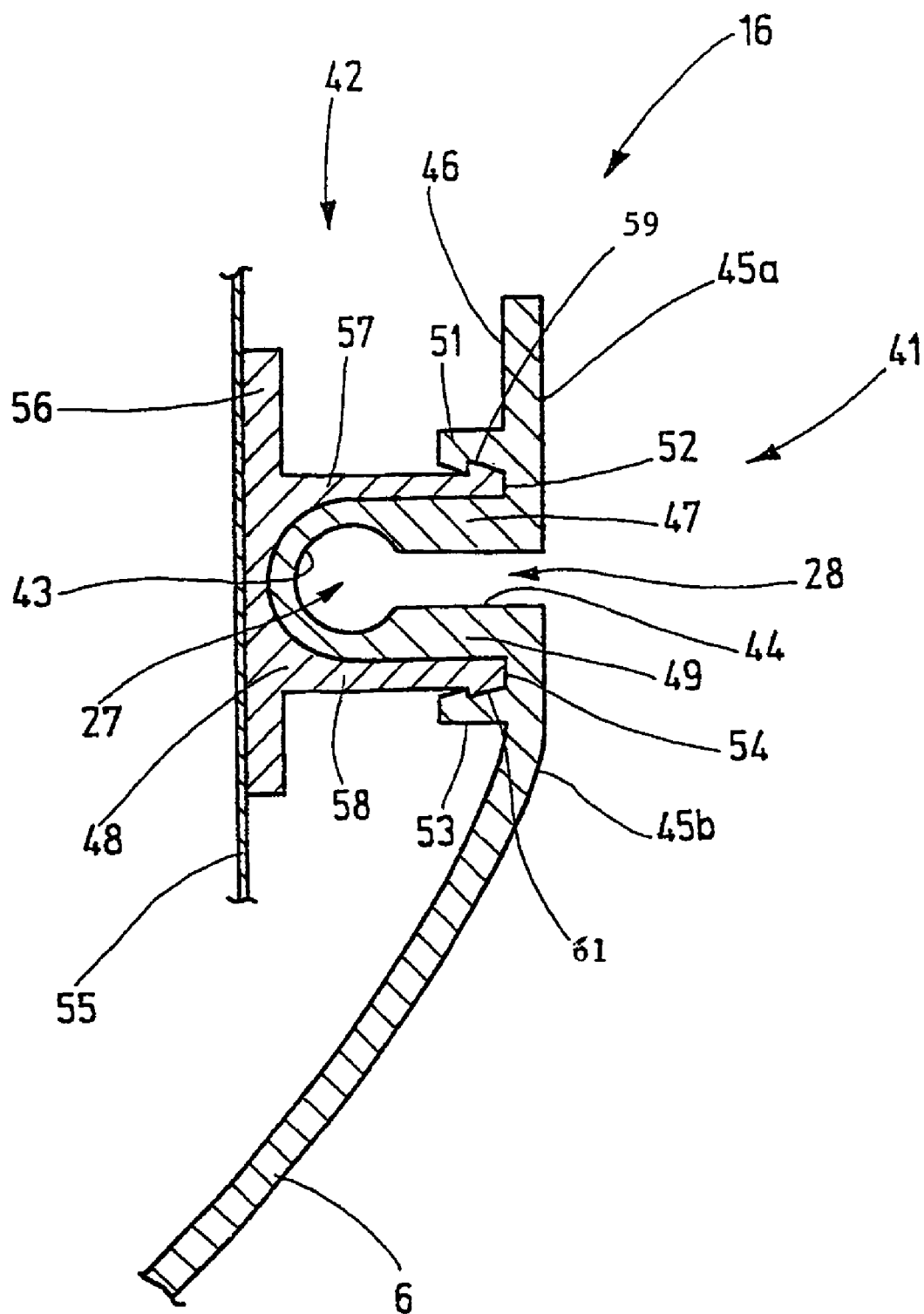
FIG. 3 is an enlarged section of a window shade guide rail arrangement according to the invention, taken transversely to a longitudinal direction of a guide groove thereof.
Figure 4:
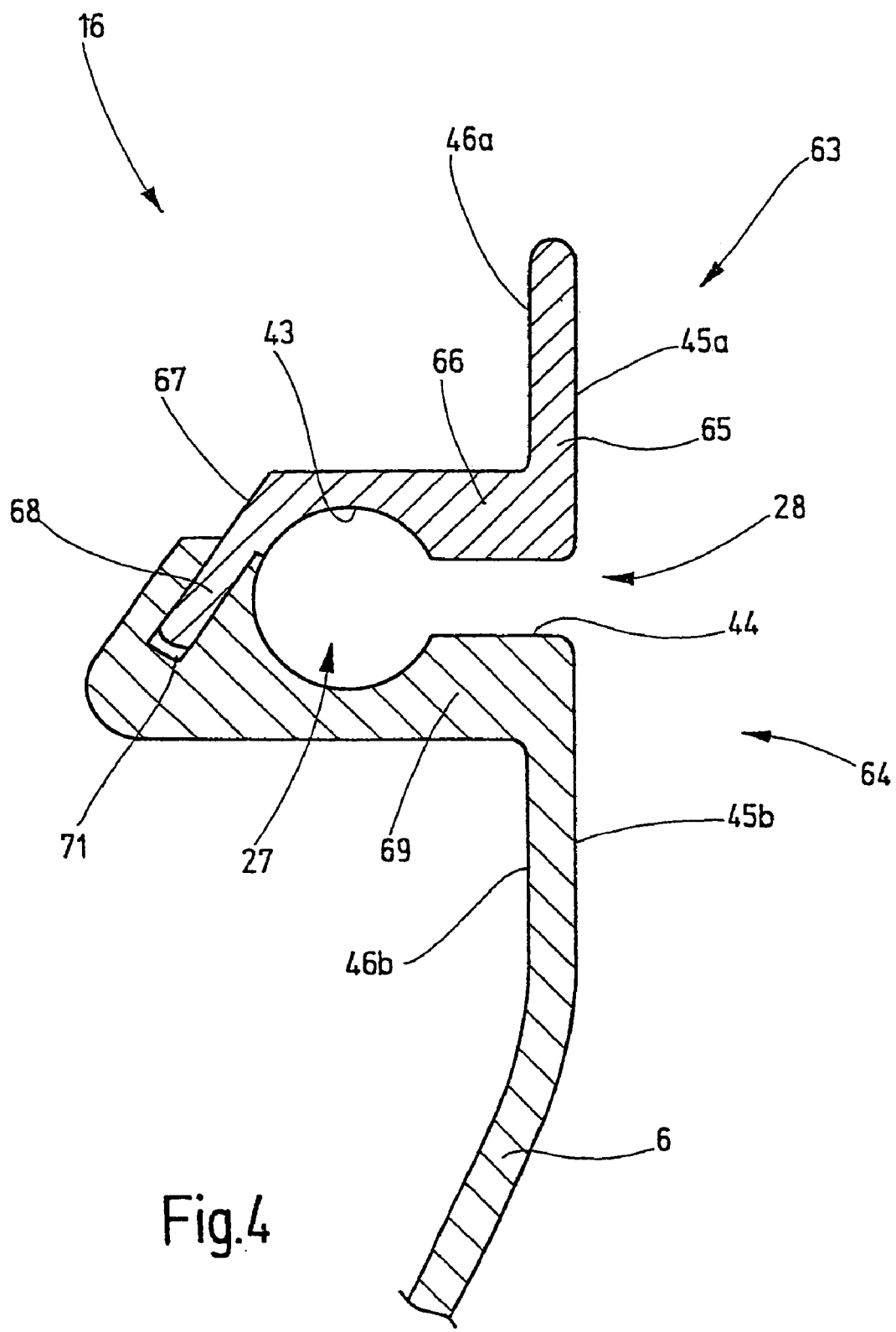
FIG. 4 is a section of an alternative embodiment of guide rail arrangement in accordance with the invention.

Each guide rail 16, as depicted in FIGS. 3 and 4, has a guide groove 27 that opens in the direction of the strip-shaped shade 15 in a guide slot 28. The lower end of each guide rail 16 is connected to a guide tube 29, 30, in which two bendable thrust elements 31, 32 are guided in a buckle-proof fashion. The bendable thrust elements 31, 32 comprise so-called Suflex shafts. They include a cylindrical core that is surrounded by a helically extending rib, which defines a flexible toothed rack with peripheral gearing.

The guide tubes 29 and 30 connect the guide rails 16 to a gear motor 33. The gear motor 33 comprises a permanently excited D.C. motor 34 which is part of a drive 35 having an output shaft 36 onto which a cylindrical gear 37 in the form of a toothed wheel is fixed. The toothed wheel 37 positively meshes with both thrust elements 31, 32. These thrust elements 31, 32 tangentially extend past the cylindrical gear 37 on diametrically opposite sides and are guided in corresponding bores 38, 39 for this purpose.

When the drive motor 33 is actuated, the thrust elements 31, 32 are selectively extended or retracted, with the guide pieces 23, 24 following the movement of the thrust elements 31, 32. These guide pieces are held against the free ends of the thrust elements 31, 32 in the guide grooves 27 with the aid of a spring 21.

The guide rails 16, as depicted in FIG. 3, include an outer part 41 and a support part 42. The outer part 41 consists of a thermoplastic material and integrally transforms into the inside lining 6 of the C-column 5. The outer part 41 defines the undercut guide groove 27 that opens outwardly through the slot 28. The guide groove 27 basically consists of a circular section 43 and a rectangular section 44. The diameter of the circular section 43 is adapted to the diameter of the guide pieces 26.

The outer part 41 has an outer or visual side 45 that extends approximately parallel to a rear side 46 thereof. The outer side 45 is divided into a section 45a and a section 45b by the slot 28.

In addition to the slot 28, the outer part 41 forms a wall section 47 that protrudes from the rear side 46 and transforms into a wall region 48 on its free end. This wall region 48 extends along a segment of a circle and is followed by a straight wall section 49 that lies parallel to the wall section 47 and ends in the wall section 45b. Accordingly, the structure on the rear side 46 in this case is free of undercuts, i.e., the two wall sections 47, 49 are limited by two parallel side walls on the outer side.

A first hook-shaped tab 51 extends adjacent to the wall section 47, namely parallel to the longitudinal direction of the slot 48. This first hook-shaped tab forms a groove 52 on the inner corner together with the wall section 47. A second hook-shaped tab 53 is arranged in the form of a mirror image of the first hook-shaped tab and is situated adjacent to the outer side of the wall section 49. This second hook-shaped tab forms a groove 54 together with the outer side of the wall section 49.

The dimensions of both hook-shaped tabs 51, 53 are chosen such that the outer part 41 can be easily removed from the complementary mold cavity of the injection mold after an injection-molding process is completed, namely by utilizing the elasticity of the hook-shaped tabs 51 and 53. Hence, complicated tools with moving cores are not required for producing the undercuts.

In addition, the wall thickness in the region of the wall section 48 surrounding the cylindrical region 43 has a cross-sectional profile chosen, in relation to the width of the slot 28, such that the finished injection-molded outer part 41 can be removed from the mold core for producing the cross section 43 and the cross section 44, namely in a direction perpendicular to the plane formed by the outer side 45*a* or 45*b*, respectively. During the removal from the injection-molding tool, the outer part 41 is widened in the region of the guide groove until the corresponding part of the mold core is able to slide through the slot 28. The outer part 41 subsequently springs back into the originally desired shape due to its inherent elasticity.

The support part 42 is provided because the structure alone could, under certain circumstances, be excessively resilient for reliably guiding the guide elements 26 and preventing their release from the guide groove 27. The support part 42 in this case is rigidly arranged on an inner side of a car body section 55. The illustrated support part 42 consists of a mounting plate 56 with two projecting limbs 57, 58. The limbs 57, 58 define an interior suitable for accommodating the rear side of the outer part 41 in the region of the guide groove 27 without play. This U-shaped opening is composed, in particular, of an arc-shaped portion that receives and is adjoined by the wall section 48, as well as two parallel surfaces that receive and are adjoined by the outer sides of the wall sections 47, 49. The free ends of both limbs 57 and 58 are provided with flat hook-shaped tabs 59, 61 that are complementary to the hook-shaped tabs 51, 53.

The support part 42 consists of a relatively rigid and inelastic material that is able to generate a sufficient resistance to forces acting in the widening direction of the slot 28 during the operation of the window shade. The support part 42 consists, for example, of an extruded aluminum profile that can be subsequently bent, if so required, in accordance with the desired configuration.

In the installed condition, the two free limbs 57, 58 enter into and interlockingly engage the grooves 52, 54. This simultaneously results in an anchoring of the inside lining 6 in the region of the guide rail 16.

According to the invention, it is possible to manufacture a plastic guide rail 16, which may be of considerable length, wherein no movable core is required in the injection-molding tool. Otherwise the mold would be extremely difficult and expensive to manufacture, namely because it is very difficult to hold a movable core in proper position over a length of approximately 50 cm of the circular part 43 of the guide groove 27, which has a diameter of approximately 8 mm. The design of the guide rail 16 in accordance with the invention eliminates the necessity for such a movable core because the core can be rigidly fixed on a web that molds the slot 28.

Another advantage of the invention can be seen in the fact that the color in the visible regions of the guide rail 16 can be made to correspond exactly to the color of the inside lining 6. This eliminates the customary measures for concealing a shiny aluminum rail.

The thermoplastic material also has superior sliding properties for the guide member 26. If the guide rail consisted of an aluminum profile, it would be necessary to manufacture the guide member 26 from plastic or to provide the guide member with a plastic coating in order to achieve suitable sliding properties. The invention eliminates these requirements.

Due to its resilience, the plastic surface of the guide rail has a much lower tendency to generate rattling noises than a hard metal surface. Only the support part 42 consists of metal. The rigid support part 42 ensures that the guide groove 27 maintains its shape over an extended period of time.

Figure 5:
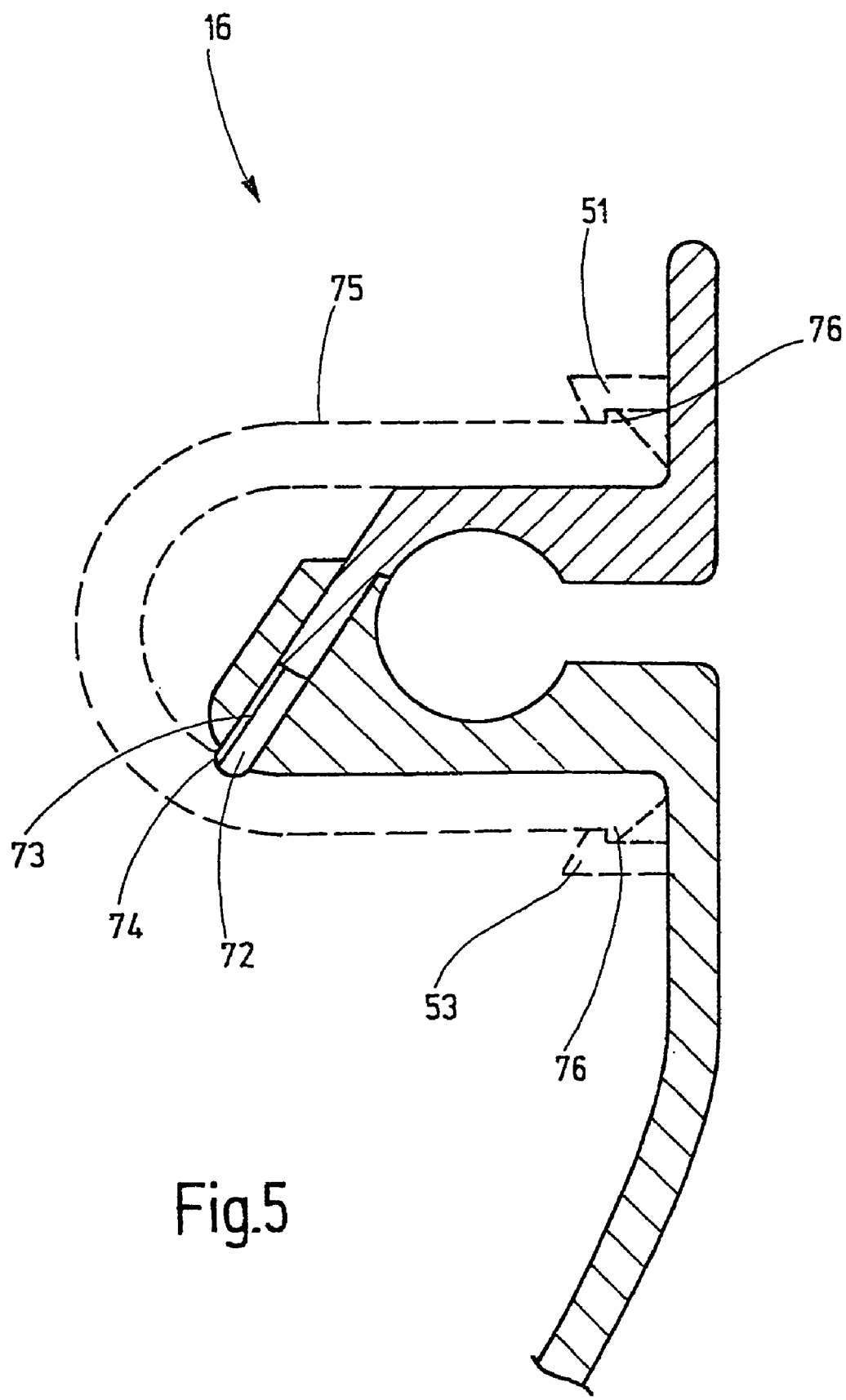
FIG. 5 is a transverse section of the guide rail shown in FIG. 4, taken at a different elevation.

Another embodiment of a plastic guide rail 16 is shown in FIGS. 4 and 5. In this embodiment, structural elements that are identical or equivalent to those described above with reference to FIG. 3 are identified by the same reference symbols and not described in detail anew. The guide rail 16 in this case has a guide groove 27 configured similar to the above-described shape, i.e., it is composed of a circular section and a rectangular section that corresponds to the slot 28.

The guide rail 16 in this instance, as depicted in FIG. 4, consists of two parts, wherein a first part 63 is integrally connected to the section 45*a* and another part 64 is integrally connected to the section 45*b*. The visual side section 45*a* forms part of a flange 65 that extends as far as the slot 28 and transforms into a wall section 66 at this location. The wall section 66*a* ends on a surface 67 that extends at an angle of approximately 30–60 degrees referred to the visual side 45*a*.

The flange 65 and the wall section 66 form an approximately rectangular profiled rail that, in turn, forms a section of the wall that corresponds to the section 43 with a circular cross section, as well as a wall section that limits the section 44 with a rectangular cross section on the outer side of the wall section or limb 66 that extends away from the inner corner, as shown in FIG. 4. The wall 67 ends approximately at the height of a plane that corresponds to the upper limiting wall of the slot 28. Beginning at this location, the wall or the limb 66 transforms into a narrow web 68 that protrudes, as shown in FIG. 4, over a plane defined by the center of the circular section 43 and the center of the slot 28. Considering the circular section 43 as a clock, the point of transition between the wall 67 and the web 68 that has a smooth outer surface that lies between 10 o'clock and 11 o'clock.

The other part 64 of the guide rail 16 forms an integral component of the inside lining 6 and has, in principle, a shape that is about complementary to that of the part 63. The visual side section 45*b* is adjoined by a limb 69 that lies parallel to the limb 66. The side of the limb 69 facing the limb 66 has an outside contour that supplements the outside contour of the limb 66 such that the complete guide groove 67 is formed.

On the opposite side of the slot 68, the limb 69 protrudes upwardly over the slot 28 by a certain distance and is provided with a groove 71 that accommodates the web 68 in the mounted condition as shown. The web 68 and the groove 71 extend over the entire length of the guide rail 16.

In order to hold the two parts 63 and 64 in the correct position in the longitudinal direction of the guide rail 16, the web 68 carries tabs 72 that are spaced apart by distances of approximately 5 cm–10 centimeter, as shown in FIG. 5. In the installed condition the tabs 72 are inserted into rectangular openings 73 provided in the base of the groove 71, namely in an extension thereof.

Ribs 74 may be provided on the tabs 72, as shown in FIG. 5. These ribs make it possible to locally weld the respective wall of the opening 73 to the rib 74. This can be effected by means of ultrasonic welding, namely by pressing corresponding sonotrodes at these locations, or alternatively, the parts may be welded to one another by means of laser welding.

If it is questionable whether or not the thermoplastic parts 63 and 64 can maintain their dimensional stability over an extended period of time, wherein the width of the gap 28 could conceivably change, an additional stabilizing element 75 can be used, as depicted in broken lines in FIG. 5. The illustrated stabilizing element 75 is shorter than the guide rail 16 and essentially has a U-shaped design. On its free ends, the stabilizing element 75 is provided with upwardly directed hook-shaped tabs 76, 77 that cooperate with hook-shaped tabs 51, 53 in a manner similar to that described above with reference to FIG. 3. Since the stabilizing element 75 adjoins the outer side of the limbs 66, 69 with the inner sides of its limbs, the slot 28 is prevented from widening, as well as from reducing its width. Several stabilizing elements 75 of this type may be provided and spaced apart from one another by a certain distance.

In the embodiments of FIGS. 4 and 5, respectively, the two parts 63, and 64 also are practically free of undercuts. The hook-shaped tabs 51, 53, if provided at all, have such small undercuts that the inherent elasticity of tabs 51, 53 would suffice for their removal from the injection-molding tool. This eliminates the need for a drawable core. Hence, the illustrated structure also makes it possible to injection-mold the guide rail from plastic by utilizing very cost-efficient injection-molding tools.

The guide rails 16 according to FIGS. 3 and 4 are shown and described as forming, at least sectionally, part of the inside lining, for example, of the C-column. However, it will be understood that the guide rails 16 also could be made separately thereof and connected to snap-in elements of the lateral lining or the car body, such as by means complementary tabs or snap-in elements. The visual side section 45b then would end approximately at the location at which the arc-shaped progression begins in the structure. The tabs for interlocking the guide rail 16 would be arranged, for example, on the limb 69 in an extension of the slot 28 in the embodiment shown in FIGS. 4 and 5.

Figure 6:
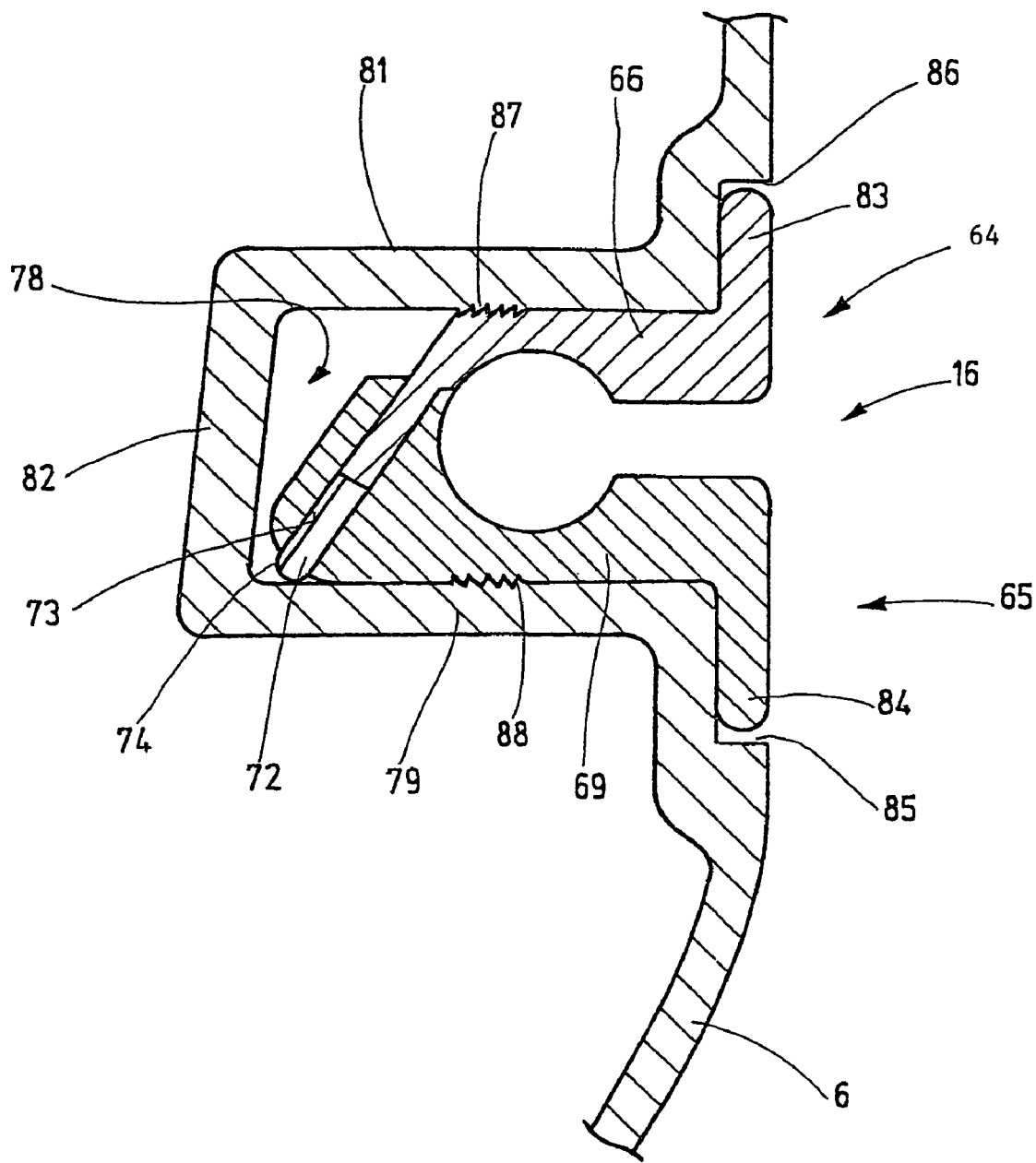
FIG. 6 is a transverse section of an embodiment of a guide rail arrangement according to the invention similar to that shown in FIG. 4, but inserted into the groove of a lateral lining.

FIG. 6 shows an embodiment of the guide rail arrangement 16 that corresponds, in principle, to the embodiment shown in FIGS. 4 and 5. However, the guide rail arrangement 16 is inserted into a groove 78 provided in the lateral lining part 6. Consequently, the lateral lining part 6 integrally extends beyond the groove 78.

The groove 78 is laterally limited by two walls 79, 81. The groove 78 has parallel flanks in this region. The two side walls 81, 79 are integrally connected to one another by a base 82. As indicated above, the guide rail arrangement 16 corresponds to the guide rail arrangement 16 shown in FIGS. 4 and 5 and is composed of the two parts 64 and 65. They form short tab-like flanges 83, 84 on the outer side of the lateral lining part, wherein said flanges are sunk in a flush fashion into corresponding depressions 85, 86 of the lateral lining part 6.

In order to positively hold the guide rail arrangement 16 in the groove 78, flutings 87, 88 with a sawtooth-shaped profile are provided on the outer side of the limb 66 and on the outer side of the limb 69, wherein said flutings are complementary to flutings on the inner side of the walls 81, 79.

From the foregoing, it can be seen that the motor vehicle window shade of the present invention comprises guide rails that consist of plastic. The guide rails are designed, in particular, such that the injection-molding tools used form the guide rails need not contain movable cores in order to produce the guide groove. Hence, they are subject to much more economical manufacture.

The invention claimed is:

1. A guide rail arrangement (16) for moveable window shades (14) in motor vehicles comprising an outer part (41) in the form of an elongated injection-molded part made of an elastically deformable material, said outer part (41) having a first connecting portion (51,53), said outer part (41) defining an undercut guide groove (27) that extends over at least part of the length of the outer part (41) for guiding movement of said window shade between open and closed positions, and a support part (42) formed from a less deformable material than the outer part (41) disposed about a portion of said outer part (41) for resisting lateral widening of said guide groove (27) during movement of said window shade and said support part (42) having a second connecting portion (59,61) that is connectable to the first connecting portion (51,53) of the outer part (41).

2. The guide rail arrangement of claim 1 in which the outer part (41) has a substantially constant wall thickness along its length.

3. The guide rail arrangement of claim 1 in which the outer part (41) has a narrow, oblong shaped section that substantially surrounds the guide groove (27).

4. The guide rail arrangement of claim 1 in which the outer part (41) has a width transverse to the groove substantially greater than a transverse width of the groove.

5. The guide rail arrangement of claim 1 in which the outer part (41) forms part of an inside lining (6) of a motor vehicle.

6. The guide rail arrangement of claim 1 in which said guide groove (27) has a cross section that defines a narrow section (44) and a wider section (43), said narrow section (44) forming a groove slot (28) communicating with the wider section (43).

7. The guide rail arrangement of claim 6 in which said narrow section (44) of said guide groove (27) has parallel flanks.

8. The guide rail arrangement of claim 6 in which said wider section (43) of said guide groove (27) has shoulders adjacent the narrow section (44), said shoulders transforming into the narrow section (44) at an obtuse angle.

9. The guide rail arrangement of claim 6 in which said wider section (43) has a circular configuration.

10. The guide rail arrangement of claim 6 in which said guide groove 27 is configured such that the outer part can be removed from a core that is immovably arranged in a mold cavity of an injection molding machine in which the outer part (41) is formed.

11. The guide rail arrangement of claim 1 in which said first connecting portion (51, 53) is adapted for snap in engagement with said second connecting portion.

12. The guide rail arrangement of claim 1 in which said first connecting portion (51, 53) comprises at least one hook.

13. The guide rail arrangement of claim 1 in which said first connecting portion (51, 53) comprises at least one undercut tab that extends in the direction of the support part (52) when engaged with the second connecting portion.

14. The guide rail arrangement of claim 1 in which the outer part (41) is made of a material selected from a group of thermoplastics that include PVC, polypropylene, polyethylene and polyamide.

15. The guide rail arrangement of claim 6, in which said support part (42) has a support portion that supports sections of the outer part (41) that defines the guide groove (27), said support portion extending in a direction parallel to a plane that extends through said slot (28) and into said guide groove (27).

16. The guide rail arrangement of claim 15 in which said support portion of said support part (42) includes a web.

17. The guide rail arrangement of claim 1 in which said support part (42) has a constant cross section over its length.

18. The guide rail arrangement of claim 1 in which said support part (42) is essentially rigid.

19. The guide rail arrangement of claim 1 in which said support part (42) has limbs (57) with hooks at their free ends that are connectible with the outer part (41).

20. The guide rail arrangement of claim 1 in which said support part (42) is an injection-molded part.

21. The guide rail arrangement of claim 1 in which said support part (42) is an extruded part.

22. A guide rail arrangement (16) for window shades (14) in motor vehicles comprising an first part (63) in the form of an elongated molded part, said first part (63) including a first connecting portion (68) and an elongated section formed with a groove that is essentially free of undercuts and extends continuously over at least a part of the length of the guide rail arrangement, a second part (64) in the form of an elongated molded part, said second part (64) having a second connecting portion (71) and an elongated section formed with a groove that is essentially free of undercuts and extends continuously over at least a part of the length of said guide rail arrangement (16); and said connecting parts (68, 71) of said first and second parts (63, 64) being interconnectable to position and retain the first and second parts (63, 64) relative to one another with said grooves of said first and second parts (63, 64) defining an undercut guide groove (27).

23. The guide rail arrangement of claim 22 in which one of said first and second connecting portions (68, 71) is in the form of a web.

24. The guide rail arrangement of claim 23 in which one of said first and second connecting portions (68, 71) includes a groove.

25. The guide rail arrangement of claim 24 in which said web (68) is formed with extensions (72).

26. The guide rail arrangement of claim 25 in which said groove (71) is formed with separate openings (73) for receiving said extensions (72).

27. The guide rail arrangement of claim 23 in which said first and second elongated sections of said first and second parts (63, 64) define a slot (28) communicating with said guide groove (27), and said web (68) defines a plane that forms an angle other than 90° with a plane extending through said slot (28) into said guide groove (27).

28. The guide rail arrangement of claim 22 including a support part (75) made of a less deformable material than said first and second parts (63, 64), said support part (75) being connectable to both said first and second part (63, 64) for stabilizing and preventing widening of said guide groove (27).

29. The guide rail arrangement of claim 24 in which one of said first and second parts is made of a thermoplastic material.

30. The guide rail arrangement of claim 22 in which said first and second parts (63, 64) are integrally connected together.

31. The guide rail arrangement of claim 30 in which said first and second parts are connected together by laser welding, ultrasonic welding, or bonding.

32. The guide rail arrangement of claim 22 in which one of said first and second parts (63, 64) forms an integral component of a section of an inside lining (6) of a motor vehicle.

33. A window shade (14) for motor vehicles comprising a rotatably supported window shade shaft (19), a strip-shaped shade (15) having one edge fixed to said window shade shaft (19), a guide (23, 24) connected to an edge (22) of the window shade strip (15) distant from said window shade shaft (19), at least one guide rail (16) for receiving and guiding one end of said window shade guide (23, 24) for relative movement, said guide rail including an outer part (41) in the form of an injection molded elongated part made of an elastically deformable material, said outer part (41) having a first connecting portion (51, 53) and being formed with an undercut guide groove (27) that extends over at least a part of the length of the outer part (41), a support part (42) made from a less deformable material than said outer part (41) disposed about a portion of said guide rail (16) for resisting lateral widening of said guide groove (27) upon said relative movement of said window shade guide (23, 24), and said support part (42) having a second connecting portion (59, 61) that can be connected to the first connecting portion (51, 53) of the outer part (41) for securing the first and outer parts together.

34. The guide rail arrangement of claim 33 in which the outer part (41) forms part of an inside lining (6) of a motor vehicle.

35. The guide rail arrangement of claim 33 in which said guide groove (27) has a cross section that defines a narrow section (44) and a wider section (43), said narrow section (44) forming a groove slot (28) communicating with the wider section (43).

36. The guide rail arrangement of claim 33 in which said first connecting portion (51, 53) is adapted for snap in engagement with said second connecting portion.

37. A window shade (14) for motor vehicles comprising a rotatably supported window shade shaft (19), a strip-shaped shade (15) having one edge fixed to said window shade shaft (19), a guide (23, 24) connected to an edge (22) of the window shade strip (15) distant from said window shade shaft (19), at least one guide rail (16) for receiving and guiding one end of said window shade guide (23, 24) for relative movement, said guide rail (16) including a first part (63) in the form of an elongated molded part having a first connecting portion (68) and an elongated section formed with a groove that is essentially free of undercuts and extends continuously over at least a part of the length of said guide rail arrangement, a second part (64) in the form of an elongated molded part that includes a second connecting portion (71) and a elongated section formed with a groove that is essentially free of undercuts and extends continuously over at least a part of the length of the guide rail arrangement, and said connecting portions (68, 71) of said first and second parts (63, 64) being interconnectable to hold the longitudinal sections of the first and second parts (63, 64) together such that the grooves therein forming a guide groove (27) for said window shade guide (23, 24).

38. The guide rail arrangement of claim 37 in which one of said first and second connecting portions (68, 71) is in the form of a web, and in which one of said first and second connecting portions (68, 71) includes a groove.

39. The guide rail arrangement of claim 38 in which said web (68) is formed with extensions (72) and said groove (71) is formed with separate openings (73) for receiving said extensions (72).

40. The guide rail arrangement of claim 38 in which said first and second elongated sections of said first and second parts (63, 64) define a slot (28) communicating with said guide groove (27), and said web (68) defines a plane that forms an angle other than 90° with a plane extending through said slot (28) into said guide groove (27).

41. The guide rail arrangement of claim 37 including a support part (75) made of a less deformable material than said first and second parts (63, 64), said support part (75) being connectable to both said first and second part (63, 64) for stabilizing and preventing widening of said guide groove (27).

42. The guide rail arrangement of claim 37 in which one of said first and second parts (63, 64) forms an integral component of a section of an inside lining (6) of a motor vehicle.

43. A window shade (14) for motor vehicles comprising a rotatably supported window shade shaft (19), a strip-shaped shade (15) having one edge fixed to said window shade shaft (19), a guide (23, 24) connected to an edge (22) of the window shade strip (15) distant from said window shade shaft (19), at least one guide rail (16) for receiving and guiding one end of said window shade guide (23, 24) for relative movement, said guide rail including an outer part (41) in the form of an injection molded elongated part made of an elastically deformable material, said outer part (41) being formed with an outwardly opening guide groove (27) that extends over at least a part of the length of the outer part (41), and a reinforcing support part (42) made from a less deformable material than said outer part (41) disposed about a portion of said guide rail (16) for resisting widening of said guide groove (27) upon said relative movement of said window shade guide (23, 24).

\* \* \* \* \*